United States Patent
Konada et al.

(10) Patent No.: US 12,030,358 B2
(45) Date of Patent: Jul. 9, 2024

(54) ACTIVE SUSPENSION DEVICE AND VEHICLE WITH ACTIVE SUSPENSION DEVICE

(71) Applicant: HONDA MOTOR CO., LTD., Tokyo (JP)

(72) Inventors: Kazuya Konada, Wako (JP); Takashi Yanagi, Wako (JP); Ryosuke Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 17/972,069

(22) Filed: Oct. 24, 2022

(65) Prior Publication Data

US 2023/0141330 A1 May 11, 2023

(30) Foreign Application Priority Data

Nov. 9, 2021 (JP) .................................. 2021-182452

(51) Int. Cl.
*B60G 17/0165* (2006.01)

(52) U.S. Cl.
CPC .... *B60G 17/0165* (2013.01); *B60G 2400/102* (2013.01); *B60G 2400/252* (2013.01); *B60G 2500/30* (2013.01)

(58) Field of Classification Search
CPC ............. B60G 17/0165; B60G 17/015; B60G 17/019; B60G 17/06; B60T 2210/10; B60T 2210/14; B60W 40/06; B60W 40/076; B60R 2021/01304
USPC .......................................................... 701/37
See application file for complete search history.

(56) References Cited

U.S. PATENT DOCUMENTS

| | | | | |
|---|---|---|---|---|
| 6,209,887 B1* | 4/2001 | Kyrtsos | ................. | B60G 17/02 280/124.157 |
| 6,311,110 B1* | 10/2001 | Ivers | ....................... | F16F 15/00 280/5.515 |
| 2008/0234896 A1* | 9/2008 | Kato | ...................... | B60G 17/06 701/37 |
| 2015/0066295 A1* | 3/2015 | Kanda | ............... | B60G 17/01933 701/38 |
| 2015/0088378 A1* | 3/2015 | Sugai | .................... | B60W 10/22 701/37 |

(Continued)

FOREIGN PATENT DOCUMENTS

JP H05-96922 A 4/1993

*Primary Examiner* — Logan M Kraft
*Assistant Examiner* — Joshua Campbell
(74) *Attorney, Agent, or Firm* — Rankin, Hill & Clark LLP

(57) ABSTRACT

An active suspension device includes: a preview sensor that detects a height of a road surface in front of a wheel; and an ECU that controls a stroke of a suspension to perform a preview control. The ECU includes: a front wheel preview control part that performs a preview control; a preview control success determination part that determines whether the preview control is successful; and a rear wheel control part that controls a stroke of a suspension of a rear wheel. When the preview control of the front wheel is successful, the rear wheel control part performs a preview control and a skyhook control of a rear wheel to control the stroke of the suspension of the rear wheel. When the preview control of the front wheel is unsuccessful, the rear wheel control part cancels the preview control of the rear wheel and perform the skyhook control of the rear wheel.

6 Claims, 7 Drawing Sheets

(56) References Cited

U.S. PATENT DOCUMENTS

| | | | |
|---|---|---|---|
| 2015/0174981 A1* | 6/2015 | Buma | B60W 40/076 348/148 |
| 2016/0325753 A1* | 11/2016 | Stein | B60W 50/0097 |
| 2020/0023705 A1* | 1/2020 | Hirao | B60G 17/0182 |

* cited by examiner

FIG. 7A
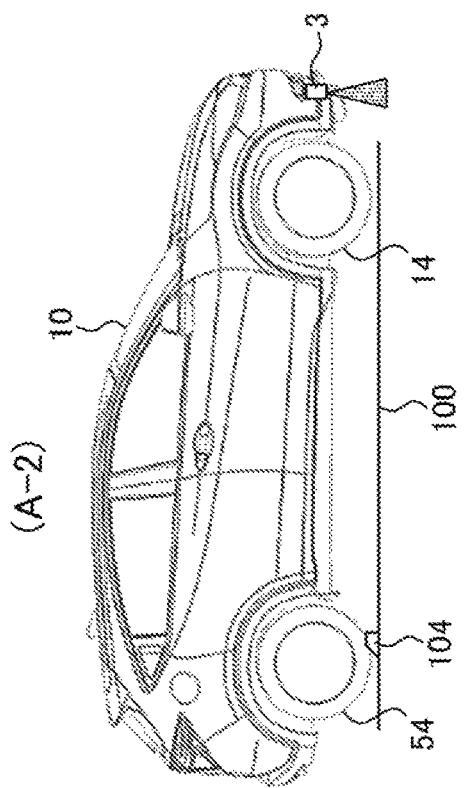
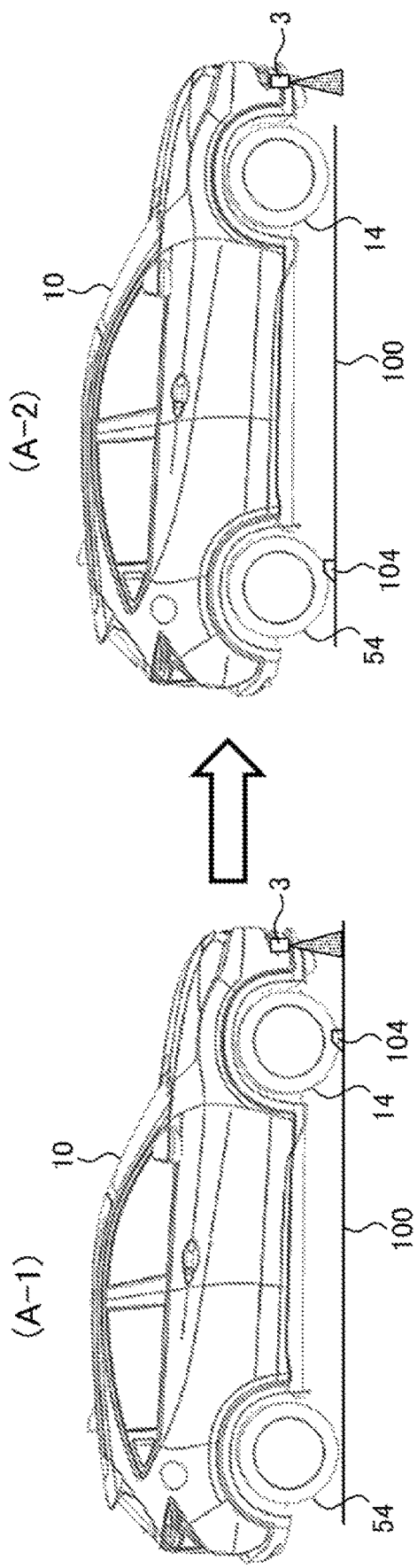
FIG. 7B
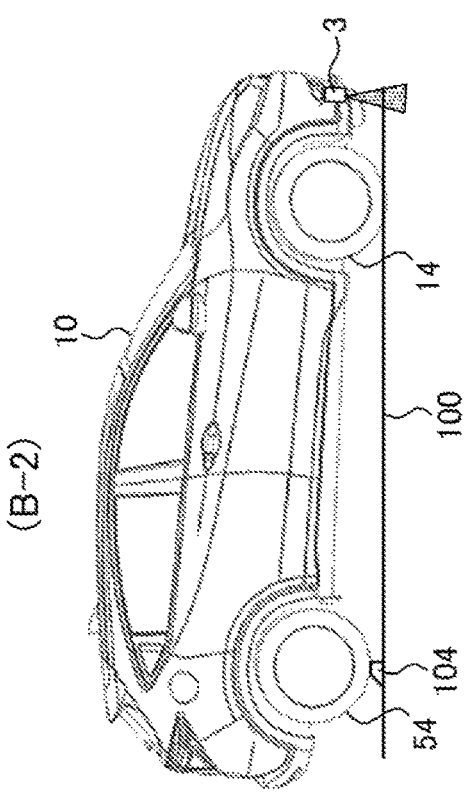
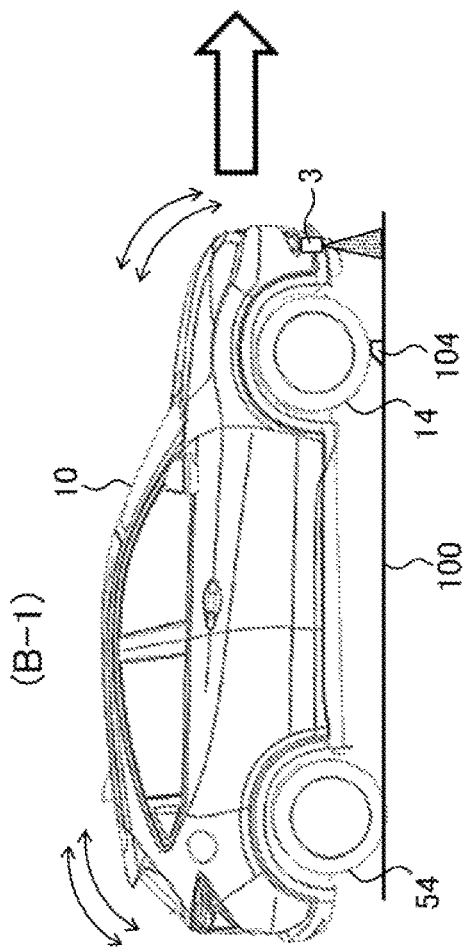

ACTIVE SUSPENSION DEVICE AND VEHICLE WITH ACTIVE SUSPENSION DEVICE

CROSS-REFERENCE STATEMENT

The present application is based on, and claims priority from, Japanese Patent Application Number 2021-182452, filed Nov. 9, 2021, the disclosure of which is hereby incorporated by reference herein in its entirety.

BACKGROUND

Technical Field

The disclosure relates to an active suspension device and a vehicle with the active suspension device.

Related Art

Vehicles equipped with electric suspensions have in recent years been implemented mainly with skyhook control, providing ride comfort that cannot be achieved with conventional suspensions. In addition, preview control has been proposed for the purpose of realizing a vehicle body (a body) that does not vibrate (body vibration of 0) through the use of electric suspensions. The preview control detects an unevenness, a level difference, or the like of a road surface in advance with a sensor and uses the detected result to control an electric suspension.

Through the use of preview control, an electric suspension is capable of being controlled to make the body vibration zero.

Patent Literature 1 (Japanese Unexamined Patent Application Publication No. 5-96922) discloses "an active suspension control device that detects a displacement X of a road surface and a vertical acceleration G at the front end of a body of a vehicle and stores them in time series. When the detection of the displacement is normal, a displacement of a road surface that the vehicle will pass over is estimated from the displacement X, and actuators at a front wheel and a rear wheel are controlled according to the estimated displacement of the road surface. When the detection of the displacement is abnormal, a vertical acceleration of a part corresponding to a rear wheel of the vehicle body is estimated from the vertical acceleration G in accordance with a wheelbase and vehicle speed, and an actuator of a rear wheel is controlled according to the estimated vertical acceleration" (see Abstract of Patent Literature 1).

A control means of the active suspension control device disclosed in Patent Literature 1 determines whether the detection of displacement by a road surface detection means is normal or abnormal. When it is determined that the detection of displacement is normal, the control means performs preview control. When it is determined that the detection of displacement is abnormal, the control means does not perform the preview control but controls the actuator of the rear wheel using the vertical acceleration stored in a storage means.

Here, when the detection of displacement is determined to be abnormal, because the control means controls the actuator of the rear wheel using the vertical acceleration stored in the storage means, vibration above a spring does not become zero. Because of this, it is possible for the ride comfort of a person on the vehicle to deteriorate.

Furthermore, when preview control cannot correctly be applied to a front wheel due to an effect of disturbance, noise, or the like, it is not preferable to apply preview control to the rear wheel. When, in a situation where preview control is not applicable, preview control is operated regardless, the ride comfort of the person on the vehicle might become worse.

SUMMARY

An active suspension device includes: a road surface state detector configured to detect a height of a road surface in front of a wheel; and a controller. The controller is configured to control a stroke of a suspension according to a variation of the height of the road surface detected by the road surface state detector to perform a preview control. The controller is configured to: change, as a front wheel preview control, a stroke of a suspension of a front wheel according to the variation of the height of the road surface detected by the road surface state detector to perform a preview control of the front wheel; determine, as a determination part, whether the preview control that has been performed by the front wheel preview control by changing the stroke of the suspension of the front wheel is successful; and control, as a rear wheel control, a stroke of a suspension of a corresponding rear wheel based on the determination of the determination part. In response to determining that the preview control of the front wheel is successful, the controller is configured, as the rear wheel control, to perform a preview control and a skyhook control of the corresponding rear wheel to control the stroke of the suspension of the corresponding rear wheel. In response to determining that the preview control of the front wheel is unsuccessful, the controller is configured, as the rear wheel control, to cancel the preview control of the corresponding rear wheel and perform the skyhook control of the corresponding rear wheel.

BRIEF DESCRIPTION OF THE DRAWINGS

FIG. 7A is an explanatory diagram showing a concept of a rear wheel control part of an ECU controlling a rear wheel with a success processing part when a preview control of a front wheel has been successful.

FIG. 7B is an explanatory diagram showing a concept of a rear wheel control part of an ECU controlling a rear wheel with a failure processing part when a preview control of a front wheel has been unsuccessful.

DETAILED DESCRIPTION

Figure 1:
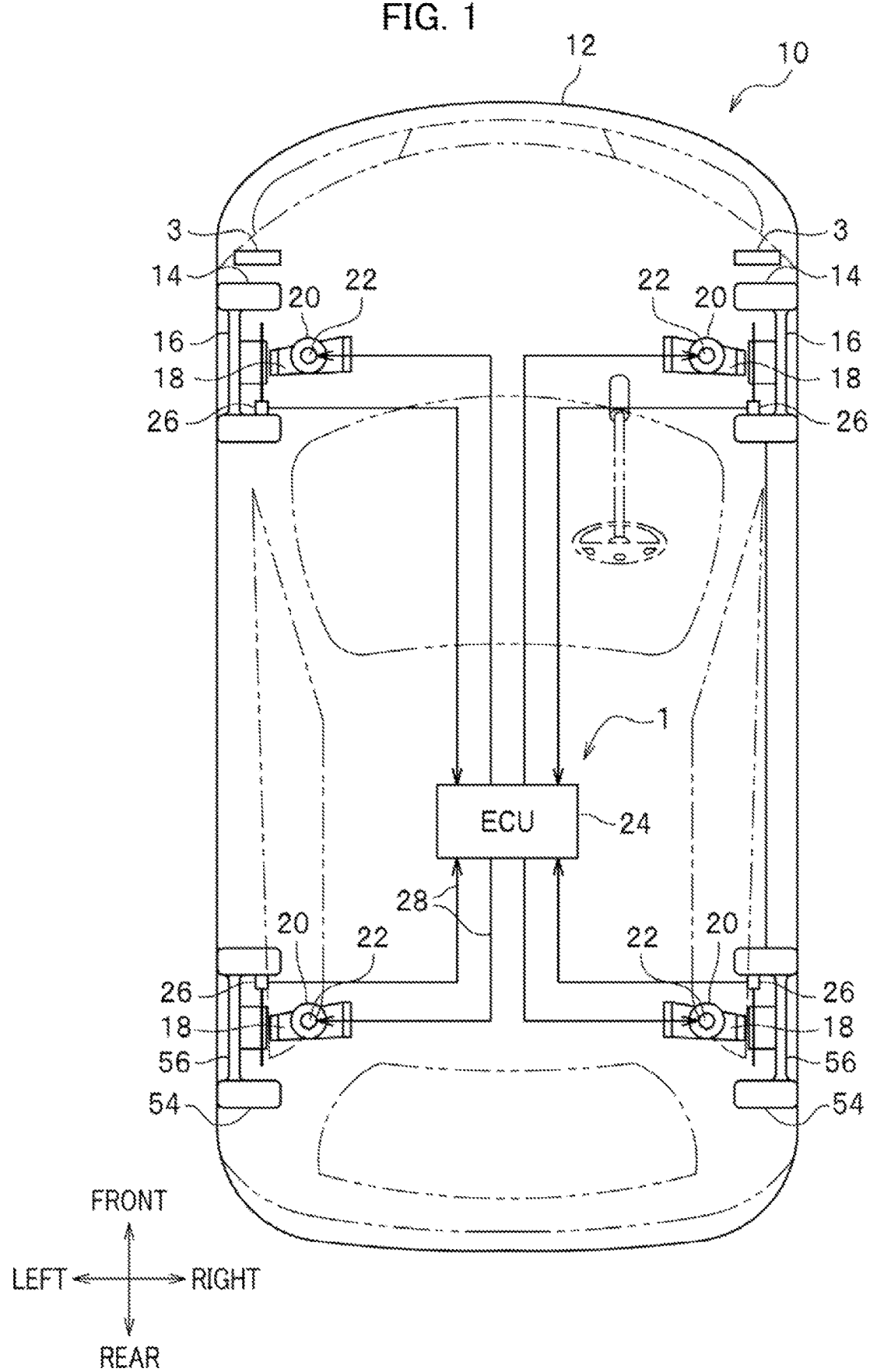
FIG. 1 is a schematic block diagram of a vehicle equipped with a suspension device in accordance with at least one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
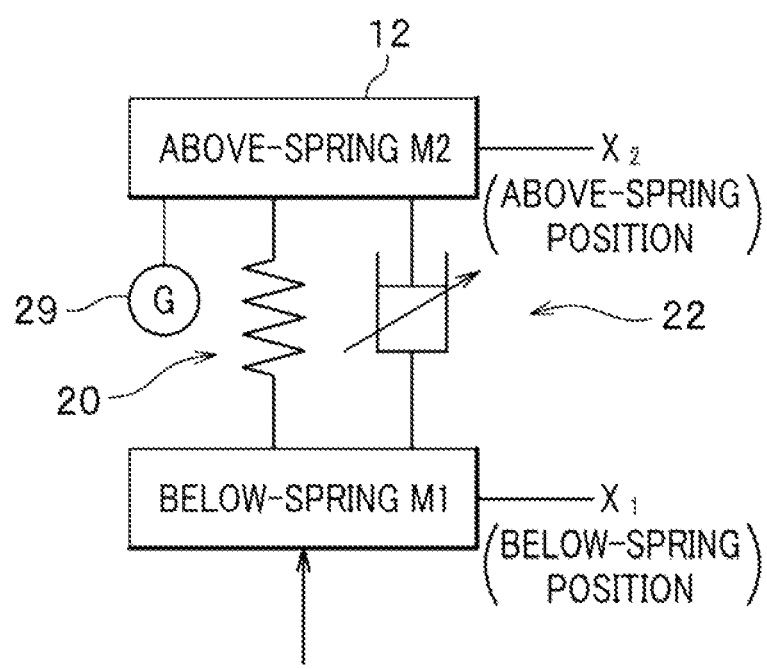
FIG. 2 is a schematic diagram of a suspension of at least one embodiment.

An embodiment of the disclosure will be described in detail with reference to the drawings. FIG. 1 is a schematic block diagram of a vehicle equipped with a suspension device in accordance with at least one embodiment of the disclosure. FIG. 2 is a schematic diagram of a suspension in the present embodiment.

As shown in FIGS. 1 and 2, a vehicle body 12 of a vehicle 10 is configured to include a wheel 16 on the left and right and a wheel 56 on the left and right. The left and right wheels 16 are each fitted with a front wheel tire 14. The left and right wheels 56 are each fitted with a rear wheel tire 54. A front wheel is configured to include a front wheel tire 14 and a wheel 16. A rear wheel is configured to include a rear wheel tire 54 and a wheel 56. A front wheel may sometimes be indicated by a front wheel tire 14 or wheel 16. A rear wheel may sometimes be indicated by a rear wheel tire 54 or wheel 56.

Each of the wheels 16, 56 is suspended from the vehicle body 12 via a suspension. The suspension is configured to include a suspension arm 18, a spring 20, a variable-damping-force damper 22 (hereinafter referred to simply as a "damper 22"), or the like. The vehicle 10 is equipped with an electronic control unit (ECU) 24 that is configured to perform various types of control. The vehicle 10 is also equipped with a wheel speed sensor 26 for each of the wheels 16, 56 (wheels 16 and 56). Each wheel speed sensor 26 is configured to detect a wheel speed V of a corresponding wheel 16, 56 (a wheel 16 or 56). The wheel speed sensor 26 detects a rotational speed of a corresponding wheel 16, 56 as a detected signal (also referred to as a wheel speed signal). In the present embodiment, the ECU 24 changes (controls) a stroke of the suspension by controlling a length of the damper 22.

The ECU 24 (a controller) is configured to include a microcomputer, ROM (read-only memory), RAM (random-access memory), a peripheral circuit, an input/output interface, various drivers, or the like. The microcomputer is configured to include a microprocessor. The ECU 24 is electrically connected to a damper 22 and vehicle speed sensor 26 of individual wheels 16, 56 (wheels 16 and 56) via a communication line (in the case of the present embodiment, via a Controller Area Network [CAN] 28). A suspension system is configured to include the ECU 24 and the wheel speed sensors 26. The ECU 24 realizes a front wheel preview control part 241, a preview control success determination part 242, and a rear wheel control part 243 by executing a predetermined control program stored in the ROM.

By way of an example, the present embodiment is described for a case where an electromagnetic damper is used, but the disclosure is not limited thereto. The disclosure is applicable to active suspension that uses an air suspension and an active stabilizer. The vehicle 10 may be a front wheel drive vehicle, a rear wheel drive vehicle, or a four wheel drive vehicle.

In the present embodiment, the damper 22 is configured, for example, from a mono-tube type (de Carbon type) damper. This damper 22 includes a cylinder (in the shape of a cylinder and having an axis) filled with a magneto-rheological fluid (MRF). The damper 22 slidably accommodates a piston rod so that the piston rod is capable of axial movement relative to the cylinder. A piston mounted at the tip of the piston rod divides the inner side of the cylinder into an upper oil chamber and a lower oil chamber. A communicating passage for communicating the upper oil chamber and the lower oil chamber is provided between the upper oil chamber and the lower oil chamber. An MLV coil is disposed inside the communicating passage.

For example, the damper 22 is configured so that: a lower end of the cylinder is connected to a suspension arm 18 serving as a wheel-side member; and an upper end of the piston rod is connected to a damper base serving as a vehicle-body-side member. As shown in FIG. 2, each damper 22 is configured to connect, together with a spring 20, a below-spring element having a mass M1 and an above-spring element having a mass M2 of a vehicle body 12. The below-spring element is a movable element on a lower side of the suspension and includes a wheel 16, 56 (a wheel 16 or 56), a knuckle, a suspension arm 18, or the like.

When an electric current is supplied from the ECU 24 to the MLV coil (not shown) of the damper 22, a magnetic field is applied to the MRF flowing through the communicating passage causing ferromagnetic particles to form chain-like clusters. As a result, an apparent viscosity (hereinafter simply referred to as "viscosity") of the MRF passing through the communicating passage increases, and the damping force of the damper 22 increases. Although a mono-tube type damper is employed as the damper 22 in the present embodiment, other types of dampers may be employed as deemed appropriate.

Further, the above-spring element is provided with an acceleration sensor 29 for detecting an acceleration of the vehicle body 12 (above spring) along a stroke axis of the damper 22. The stroke axis refers to an axis along which a suspension stroke movement occurs. When the acceleration sensor 29 detects an acceleration of the vehicle body 12 (above spring), the ECU 24 obtains said acceleration as an above-spring acceleration. The ECU 24 obtains an above-spring speed by time integrating the above-spring acceleration with time series information. The acceleration sensor 29 may obtain a below-spring acceleration of the below-spring element, and the ECU 24 may obtain a below-spring speed of the below-spring element. The calculation of the above-spring speed or below-spring speed is not limited to time integration by the ECU 24. The above-spring speed or below-spring speed may be obtained by using, for example, a gyroscope.

The vehicle 10 is equipped with a preview sensor (road surface state detector) 3 in front of a front wheel tire 14. The preview sensor 3 is configured to detect a condition of a road surface 100 (see FIG. 3) at the front of the vehicle 10. A preview sensor 3 for the front wheel tire 14 on the left is provided on the left side of the vehicle 10. A preview sensor 3 for the front wheel tire 14 on the right is provided on the right side of the vehicle 10. Each preview sensor 3 detects a height of the road surface in front of each wheel 16. The ECU 24 performs a preview control by controlling the stroke of a suspension according to a variation of the height of the road surface that is detected by a preview sensor 3. An active suspension device 1 of the present embodiment is configured to include the preview sensor 3 and the ECU 24.

Figure 3:
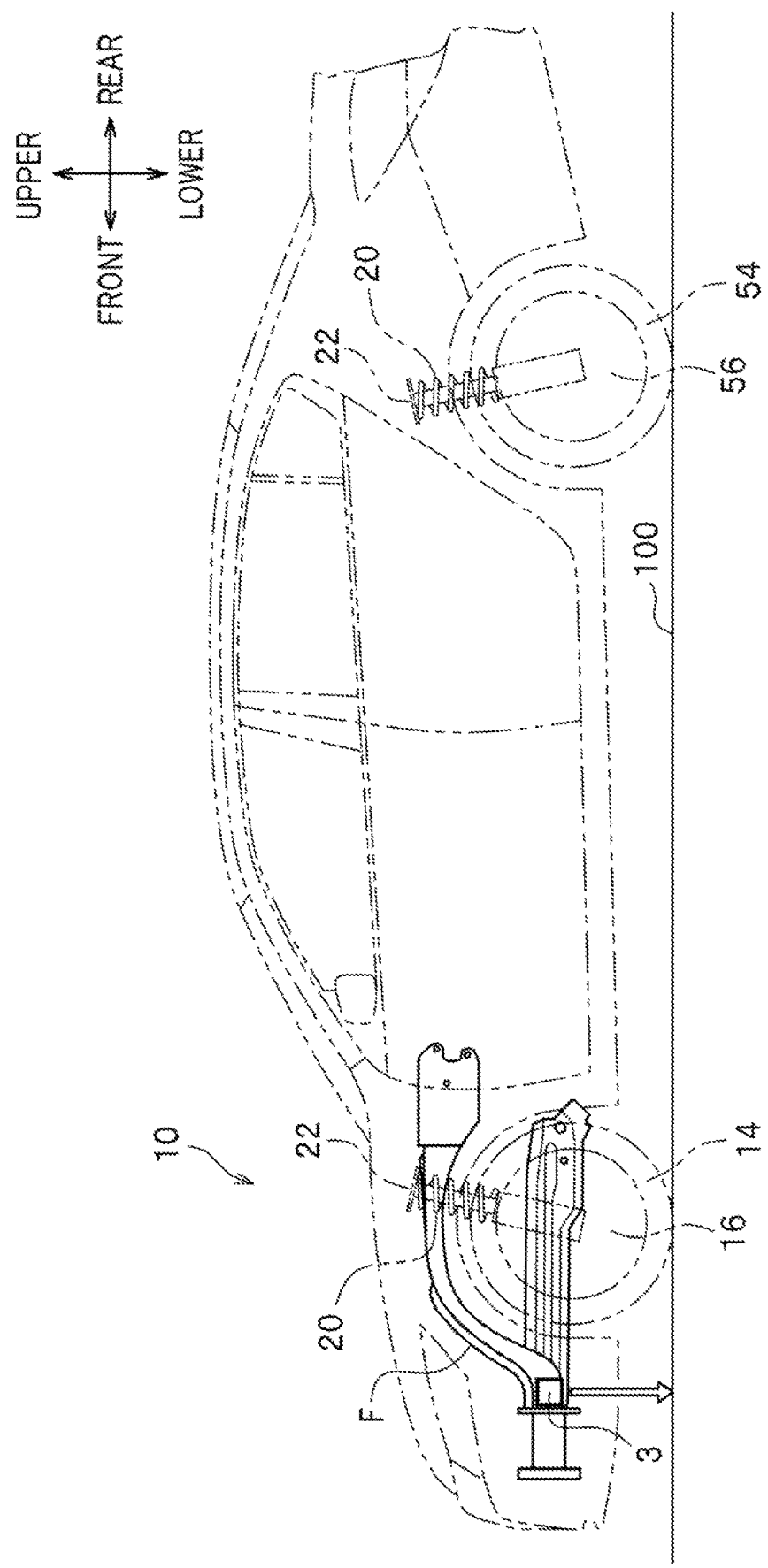
FIG. 3 is a schematic diagram of a vehicle equipped with an active suspension device in accordance with at least one embodiment.

FIG. 3 is a schematic diagram of a vehicle equipped with an active suspension device 1 in accordance with the present embodiment. As shown in FIG. 3, the preview sensor 3 detects a state (road surface state) of the road surface 100 at the front side of the vehicle 10.

The preview sensor 3 is provided on a frame member F that make up a front portion of the vehicle body of the vehicle 10 (that is, the preview sensor 3 is provided on the vehicle body 12). The preview sensor 3 is located further to the front of the frame member F relative to a wheel 16 of a front wheel. As indicated by the outlined arrow, the preview sensor 3 detects the state of the road surface 100 immediately in front of the wheel 16 of the front wheel. The preview sensor 3 may be selected from a radar-type sensor, a camera-type sensor, a laser-type sensor, an ultrasonic-type sensor, or the like as deemed appropriate. The preview sensor 3 is not limited to being configured from a single sensor. The preview sensor 3 may be configured from a combination of sensors including different types of sensors, for example a camera-type sensor and a laser-type sensor. A preview sensor 3 is provided in front of a wheel 16 of each of the left and right front wheels.

Figure 4:
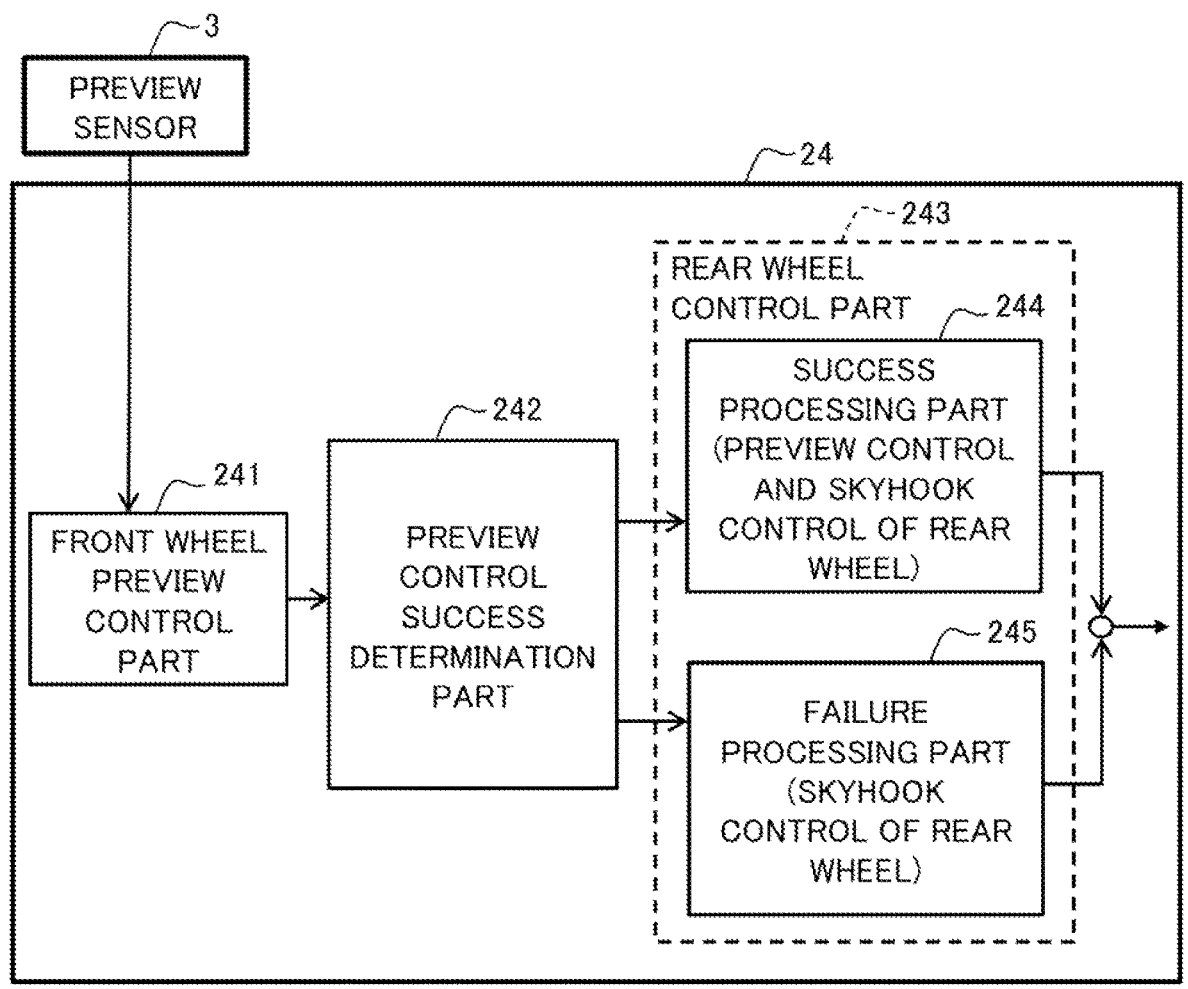
FIG. 4 is a functional block diagram showing a function of an ECU of an active suspension device in accordance with at least one embodiment.

FIG. 4 is a functional block diagram showing a function of the ECU 24 of the active suspension device 1 in accordance with the present embodiment.

The ECU 24 is configured to include a front wheel preview control part 241, a preview control success determination part 242 (determination part), and a rear wheel control part 243. The rear wheel control part 243 is configured to include a success processing part 244 and a failure processing part 245. The ECU 24 controls the stroke of a suspension (the length of a damper 22) according to a variation of the height of the road surface 100 that has been detected by a preview sensor 3 (see FIG. 3).

The front wheel preview control part 241 obtains the height of the road surface 100 in front of a wheel 16 of a front wheel from the preview sensor 3. The front wheel preview control part 241 changes the stroke of the suspension of the front wheel according to a variation of the height of the road surface 100 detected by the preview sensor 3 to perform a preview control. For example, in accordance with an obtained height of the road surface 100, the front wheel preview control part 241 adjusts the length of the damper 22 of a corresponding front wheel.

In other words, the front wheel on the right side of the vehicle 10 adjusts the length of the damper 22 of the front wheel on the right side according to a height of the road surface 100 on the right side. The front wheel on the left side of the vehicle 10 adjusts the length of the damper 22 of the front wheel on the left side according to a height of the road surface 100 on the left side.

The preview control success determination part 242 (determination part) determines whether a preview control by the front wheel preview control part 241, which involves changing the length of the damper 22 (the stroke of the suspension) of a front wheel to control said stroke, is successful.

To determine whether the preview control has been successful (or unsuccessful), the preview control success determination part 242, for example, compares an actual body operation with a theoretical vehicle model that assumes an operation when the preview control of the front wheel is turned off. The preview control success determination part 242 determines that the preview control of the front wheel has been unsuccessful (has failed) when the actual body operation is worse than the theoretical vehicle model. For example, the preview control success determination part 242 determines that the preview control of the front wheel has been unsuccessful (has failed) when a value of the actual body operation is worse than a value for the theoretical vehicle model. More specifically, the preview control success determination part 242 may determine that the preview control has been unsuccessful (has failed) when a value of a corresponding acceleration sensor 29 at a time when the front wheel is passing over a level difference of the road surface 100 is equal to or greater than a predetermined value.

Note that the determination of the preview control success determination part 242 is not limited to the comparison between the theoretical vehicle model and the actual body operation. For example, when the acceleration sensor 29 has an absolute value, the preview control success determination part 242 may determine that the preview control has been unsuccessful when the absolute value is equal to or greater than a predetermined threshold value of the acceleration sensor 29, and cancel (in other words, turn off) a preview control of the rear wheel.

The rear wheel control part 243 controls the stroke of the suspension of a corresponding rear wheel based on the determination result of the preview control success determination part 242. For example, the rear wheel control part 243 controls the stroke of the suspension by adjusting the length of a damper 22.

For example, when the preview control success determination part 242 determines that a preview control of a front wheel has been successful, the rear wheel control part 243 performs, through the success processing part 244, a preview control and a skyhook control of a corresponding rear wheel.

When, on the other hand, the preview control success determination part 242 determines that a preview control of a front wheel has failed, the rear wheel control part 243, through the failure processing part 245, cancels a preview control of a corresponding rear wheel and performs a skyhook control of the corresponding rear wheel. The skyhook control is a control for damping the vibration of the above-spring element (vehicle body 12) by actively adjusting the length of a damper 22 based on a skyhook theory. With skyhook control, information from the preview sensor 3 is not used.

As described above, when a preview control of a front wheel has been unsuccessful, the ECU 24 of the active suspension device 1 according to the present embodiment cancels a preview control for the suspension of a corresponding rear wheel and performs a skyhook control for the suspension of the corresponding rear wheel.

When the preview control of the front wheel fails, it is highly possible that a preview control of the rear wheel will also fail. The present embodiment is able to avoid performing a preview control for a rear wheel when the possibility of failure of the preview control is high.

In the above situation, the active suspension device 1 performs only the skyhook control on the rear wheel. This way, the present embodiment is able to prevent a possibility of the ride comfort of a person on the vehicle from becoming worse. In other words, because preview control that is highly likely to deteriorate ride comfort is not performed on the rear wheel, deterioration of the ride comfort can be avoided.

Furthermore, the rear wheel control part 243 may increase (change) a gain of the skyhook control of the rear wheel when the preview control of the front wheel has been successful compared to when the preview control of the front wheel has been unsuccessful. That is, the rear wheel control part 243 may increase the weight of the skyhook control of the rear wheel when the preview control of the front wheel has been successful.

To explain further, when the preview control of a front wheel has been successful, because skyhook control is performed for a portion that cannot be covered by preview control, a ratio of the skyhook control is smaller compared to when the preview control of the front wheel has been unsuccessful (when the preview control of the front wheel has been unsuccessful, the suspension of the rear wheel is controlled entirely by skyhook control). Therefore, when the preview control of the front wheel is successful, by increasing (changing) the gain of the skyhook control of the rear wheel, an amount of control for the rear wheel that may be deemed necessary may be outputted. Here, the rear wheel control part 243 according to the present embodiment is not limited to increasing the gain of the skyhook control of the rear wheel when the preview control of the front wheel has been successful compared to when the preview control of the front wheel has been unsuccessful. For example, the rear wheel control part 243 according to the present embodiment may change the gain so that a smaller gain is used when the preview control of the front wheel is successful compared to when the preview control of the front wheel is unsuccessful.

The rear wheel control part 243 controls, for each rear wheel, the stroke of the suspension of the rear wheel based on the determination result of the preview control of a corresponding front wheel. When the preview control of the left front wheel and the preview control of the right front wheel have been unsuccessful, the preview control is cancelled for each of the left and right rear wheels and the skyhook control is performed for each of the left and right rear wheels. When, on the other hand, the preview control of, for example, the right front wheel fails, the preview control of the right rear wheel is cancelled and the skyhook control of the right rear wheel is performed.

As described above, the active suspension device 1 according to the present embodiment performs preview control of a front wheel and, when the preview control fails, performs skyhook control on a corresponding rear wheel. In this way, the active suspension device 1 according to the present embodiment is able to prevent the possibility of a deterioration of the ride comfort of a person on the vehicle.

Next, load control related to preview control and skyhook control will be described.

Load Control of ECU

Figure 5:
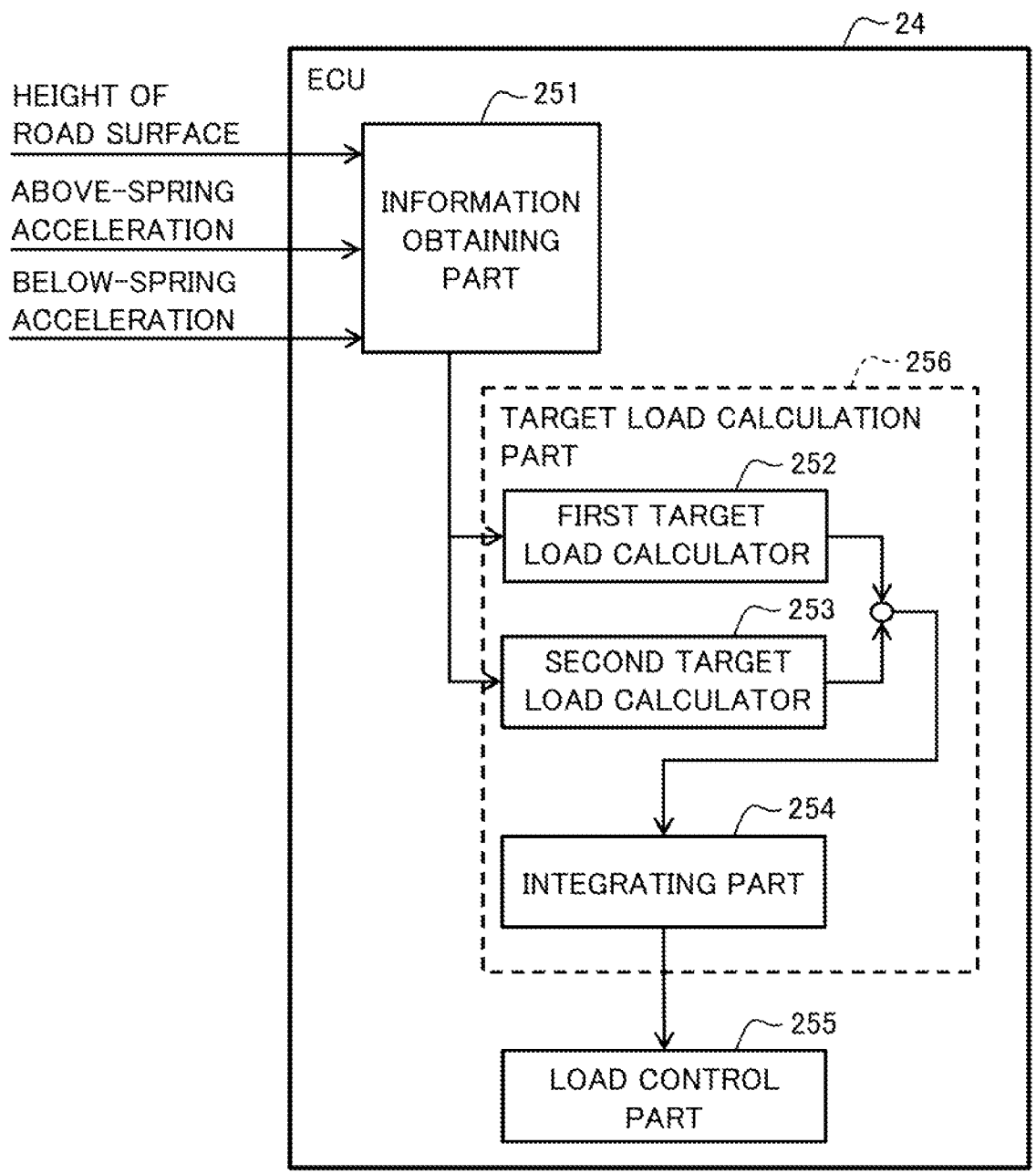
FIG. 5 is an explanatory diagram for explaining load control of an ECU included in an active suspension device that is in accordance with at least one embodiment.

FIG. 5 is an explanatory diagram for explaining a load control of the ECU 24 of the active suspension device 1 according to an embodiment of the disclosure. It should be noted that the load control of the ECU 24 is an example of a function of the ECU 24 of the active suspension device 1 shown in FIG. 4 and is not limited to this.

The ECU 24 shown in FIG. 5 is configured to include an information obtaining part 251, a target load calculation part 256, and a load control part 255. The target load calculation part 256 is configured to include a first target load calculator 252, a second target load calculator 253, and an integrating part 254.

The information obtaining part 251 obtains information on a height (relative road-surface height) of the road surface 100 as time-series information of a road surface state of a road on which the vehicle 10 travels. The road surface condition is related to a road surface along a direction of travel of the vehicle 10. The information on relative road-surface height is, for example, obtained by detecting a relative road-surface height of the vehicle 10 with by the preview sensor 3. The relative road-surface height refers to a height of the above-spring element (vehicle body 12) relative to the road surface 100.

For example, the information obtaining part 251 obtains time series information on each of the above-spring acceleration and the below-spring acceleration. Information on the above-spring acceleration is obtained based on a detected value of the acceleration sensor 29 that the above-spring element (vehicle body 12) of the vehicle 10 is equipped with. Information on the below-spring acceleration is obtained based on a detected value of an acceleration sensor (not shown) that the below-spring element of the vehicle 10 is equipped with. Note that the below-spring acceleration is an arbitrary component, and an embodiment is not particularly limited to the information obtaining part 251 obtaining the below-spring acceleration. In one or more embodiments, the information obtaining part 251 does not obtain the below-spring acceleration.

The information obtaining part 251 estimates an "above-spring speed" and an "absolute road-surface height" based on the height (relative road-surface height) of the road surface 100, above-spring acceleration, and below-spring acceleration that have been obtained. For example, the information obtaining part 251 estimates the "above-spring speed" as a current vehicle state. The "absolute road-surface height" means an absolute height of the above-spring element (vehicle body 12) with respect to the road surface 100.

In this case, based on the time series information of each of the above-spring acceleration, below-spring acceleration, and height of the road surface 100 (relative road-surface height), the information obtaining part 251 estimates the "absolute road-surface height", which is obtained by subtracting an error associated with vehicle body vibration from a relative road-surface height that includes said error. In one or more embodiments, the information obtaining part 251 may obtain the "above-spring speed" and "below-spring speed" directly by using, for example, a gyroscope (and obtaining the "above-spring speed" and "below-spring speed" directly from the gyroscope).

Information on the "above-spring speed" (vehicle state quantity) estimated by the information obtaining part 251 is sent to the first target load calculator 252. Information on the "absolute road-surface height" estimated by the information obtaining part 251 is sent to the second target load calculator 253.

Next, based on the various information that has been obtained by the information obtaining part 251, the target load calculation part 256 calculates, for example using arithmetic operation, an integrated target load. The integrated target load is a target value of a damping operation and an expansion/contraction operation of the damper 22.

The first target load calculator 252 of the target load calculation part 256 calculates a first target load related to skyhook control based on the "above-spring speed" (vehicle state quantity) estimated by the information obtaining part 251. More specifically, for example, the first target load calculator 252 calculates the first target load by using a control law based on the skyhook theory and multiplying the estimated "above-spring speed" (vehicle state quantity) by a skyhook damping coefficient. The first target load calculated by the first target load calculator 252 is sent to the integrating part 254.

For the skyhook control of a rear wheel, when it is determined that a preview control of a front wheel is successful, the target load calculation part 256 may further multiply the first target load with a gain to change the gain of the skyhook control.

The second target load calculator 253 of the target load calculation part 256 calculates a second target load related to preview control based on the "absolute road-surface height" (an actual road-surface height) estimated by the information obtaining part 251. More specifically, for example, the second target load calculator 253 calculates the second target load by using a control law based on the skyhook theory and multiplying the "absolute road-surface height" (actual road-surface height) with a preview-control gain. The second target load calculated by the second target load calculator 253 is sent to the integrating part 254.

The integrating part 254 of the target load calculation part 256 adds the first target load calculated by the first target load calculator 252 and the second target load calculated by the second target load calculator 253 to obtain a combined target load. Information on the combined target load that has been obtained by the integrating part 254 is sent to the load control part 255.

The load control part 255 calculates a target value of an electric current (target electric-current value) capable of achieving the combined target load calculated by the target load calculation part 256. For example, the load control part 255 performs a drive control of an electric motor, that each of the dampers 22 is equipped with, so that a motor current of the electric motor (not shown) follows the calculated target electric-current value.

By performing the drive control of the electric motor in this manner, the length of the corresponding damper 22 may be adjusted to control the stroke of the corresponding suspension.

Operation of Active Suspension Device

Figure 6:
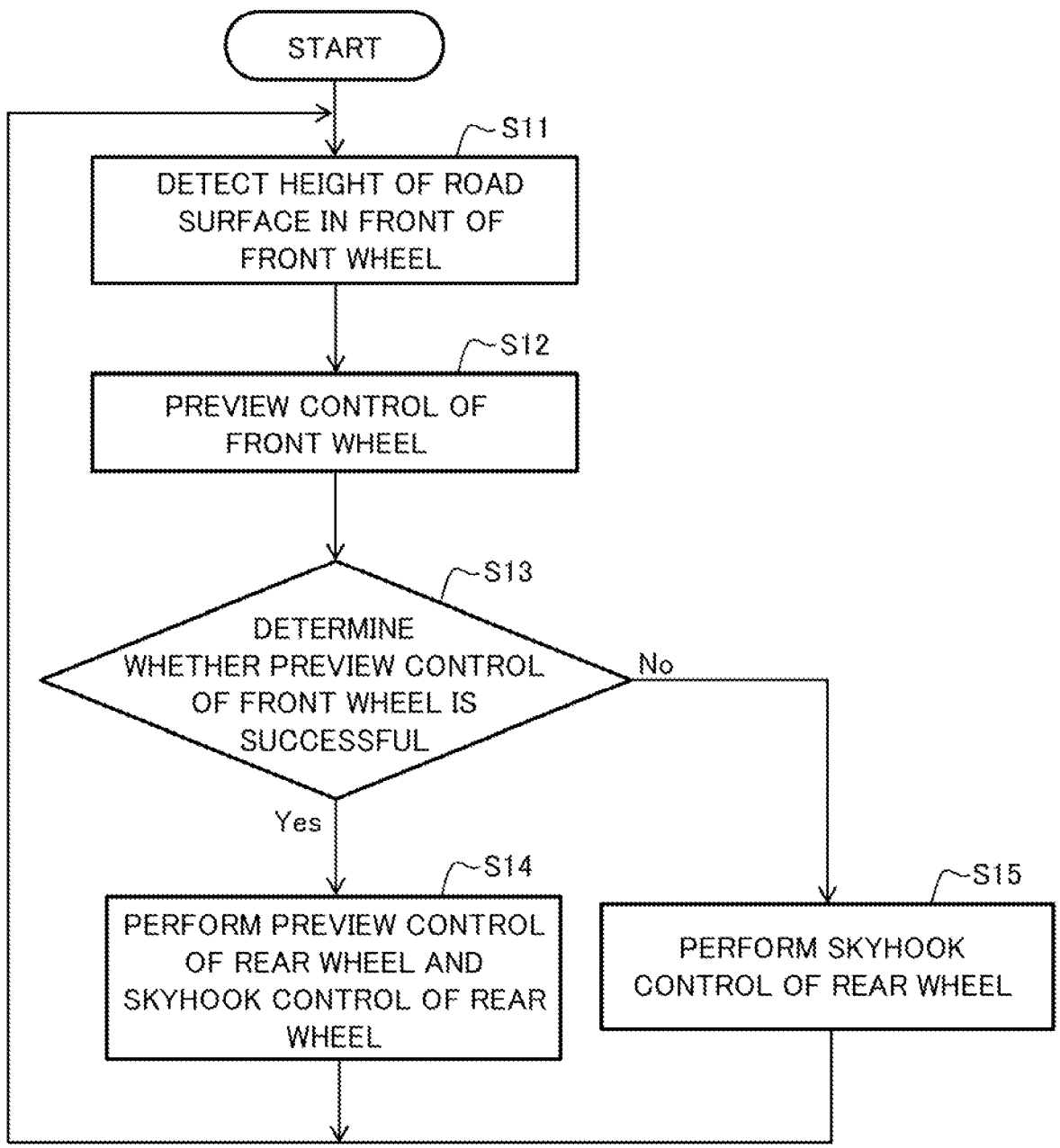
FIG. 6 is a flowchart showing an operation of the active suspension device in accordance with at least one embodiment.

Next, an operation of the active suspension device 1 according to the present embodiment will be described. FIG. 6 is a flowchart showing the operation of the active suspension device 1 according to the present embodiment. The operation of the active suspension device 1 will be described with reference to FIGS. 1-4 as appropriate.

First, a preview sensor 3 detects a height of the road surface 100 in front of a front wheel (wheel 16) of a travelling vehicle 10 (step S11).

The front wheel preview control part 241 of the ECU 24 obtains the height of the road surface 100 in front of the front wheel from the preview sensor 3. The front wheel preview control part 241 performs a preview control by changing the stroke of a suspension of the front wheel according to a variation of the height of the road surface 100 detected by the preview sensor 3 (step S12).

For example, according to the obtained height of the road surface 100, the front wheel preview control part 241 adjusts the length of the damper 22 of a corresponding wheel 16. In the case of this example, a wheel 16 on the right side of the vehicle 10 adjusts the length of the damper 22 of the wheel 16 on the right side according to a height of the road surface 100 on the right side. Furthermore, in the case of this example, a wheel 16 on the left side of the vehicle 10 adjusts the length of the damper 22 of the wheel 16 on the left side according to a height of the road surface 100 on the left side.

The preview control success determination part 242 determines whether the preview control by the front wheel preview control part 241 involving changing the length (the stroke of the suspension) of the damper 22 of the front wheel and controlling said stroke is successful (or unsuccessful) (step S13).

For example, the preview control success determination part 242 compares an actual body operation with a theoretical vehicle model that assumes an operation when a preview control of a wheel 16 is turned off. When the actual body operation is worse than the theoretical vehicle model, the preview control success determination part 242 determines that the preview control of the wheel 16 has been unsuccessful. For example, when a value of the actual body operation is worse than a value of the theoretical vehicle model, the preview control success determination part 242 determines that the preview control of the wheel 16 has been unsuccessful. More specifically, the preview control success determination part 242 may determine that the preview control has been unsuccessful when a value of a corresponding acceleration sensor 29 at a time when the wheel 16 is positioned over a level difference (for example, a bump) of the road surface 100 is equal to or greater than a predetermined value.

Note that the preview control success determination part 242 is not limited to comparing the theoretical vehicle model and the actual body operation. For example, when the acceleration sensor 29 has an absolute value, the preview control success determination part 242 may determine that the preview control has failed (not succeeded) when the absolute value is equal to or greater than a predetermined threshold value and cancel (i.e., turn off) the preview control of the rear wheel.

When the preview control success determination part 242 determines that the preview control of a wheel 16 has been successful (Yes in step S13), the rear wheel control part 243 performs a preview control and a skyhook control to adjust the length of the damper 22 of a corresponding rear wheel through the success processing part 244 (step S14).

When the preview control success determination part 242 determines that the preview control of a wheel 16 has been unsuccessful (No in step S13), the rear wheel control part 243 cancels a preview control of a corresponding rear wheel and performs a skyhook control of the corresponding rear wheel through the failure processing part 245 (step S15).

As described above, when the preview control of a front wheel fails (is unsuccessful), the ECU 24 of the active suspension device 1 according to the present embodiment cancels a preview control for the suspension of a corresponding rear wheel and performs a skyhook control for said suspension. In this way, the active suspension device 1 reduces the above-spring vibration to 0 through the skyhook control and therefore prevents the possibility of deterioration of a ride comfort of a person travelling in the vehicle 10.

Effect of the Present Embodiment

An object of the disclosure is to provide an active suspension device and a vehicle equipped with the active suspension device that are capable of preventing a deterioration in a ride comfort of a person on a vehicle.

According to the disclosure, it is possible to provide an active suspension device and a vehicle equipped with the active suspension device that are capable of preventing a deterioration in a ride comfort of a person on a vehicle.

FIG. 7A is an explanatory diagram showing a concept of the rear wheel control part 243 of the ECU 24 controlling a rear wheel through the success processing part 244 when a preview control of a front wheel is successful. FIG. 7B is an explanatory diagram showing a concept of the rear wheel control part 243 of the ECU 24 controlling the rear wheel through the failure processing part 245 when the preview control of the front wheel is unsuccessful.

After a preview control of a front wheel is performed, the ECU 24 determines whether the preview control of the front wheel has been successful or unsuccessful through the preview control success determination part 242. The rear wheel control part 243 controls the stroke of the suspension of a rear wheel corresponding to the front wheel based on the determination result of the preview control success determination part 242.

As shown in FIG. 7A, when the preview control success determination part 242 determines that a preview control of the front wheel tire 14 on the right side of the vehicle 10 has been successful, the rear wheel control part 243 performs a preview control and a skyhook control through the success processing part 244 to control the stroke of the suspension for the rear wheel (rear wheel tire 54) on the right side of the vehicle 10 (in other words, the rear wheel on the same side as the front wheel).

The left side of FIG. 7A (see [A-1] of FIG. 7A) shows that, after the front wheel tire 14 on the right side has passed over a projection 104, the preview control success determination part 242 determines that a preview control by the front wheel preview control part 241 has been successful. The right side of FIG. 7A (see [A-2] of FIG. 7A) shows that, due to the success of the preview control, the rear wheel control part 243 performs a preview control and a skyhook control for the rear wheel (rear wheel tire 54) on the right side through the success processing unit 244.

FIG. 7B shows a different case. FIG. 7B is an illustration of when the preview control success determination part 242 determines that a preview control of the front wheel tire 14 on the right side of the vehicle 10 has been unsuccessful, and the rear wheel control part 243 cancels a preview control for the rear wheel (rear wheel tire 54) on the right side and performs a skyhook control for the rear wheel (rear wheel tire 54) on the right side through the failure processing part 245.

The left side of FIG. 7B (see [B-1] of FIG. 7B) shows that, after the front wheel tire 14 on the right side has passed over the projection 104, the preview control success determination part 242 determines that the preview control by the front wheel preview control part 241 has been unsuccessful (failed). The right side of FIG. 7B (see [B-2] of FIG. 7B) shows that, due to the failure of the preview control, the rear wheel control part 243 cancels a preview control for the rear wheel (rear wheel tire 54) on the right side (the same side as the front wheel) and performs a skyhook control for the rear wheel (rear wheel tire 54) on the right side (the same side as the front wheel) through the failure processing part 245.

Through the failure processing part 245, the rear wheel control part 243 may, by performing a skyhook control, perform a suspension control that uses skyhook control without preview control. In this way, the ECU 24 absorbs the vibration generated in the rear wheel tire 54 on the right side. Failure of the preview control of a front wheel occurs, for example, when the projection 104 is unable to be detected.

As described above, the rear wheel control part 243 may increase the gain of the skyhook control of the rear wheel tire 54 when the preview control of the front wheel tire 14 is successful compared with the gain of the skyhook control of the rear wheel tire 54 when the preview control of the front wheel tire 14 is unsuccessful. In this way, by increasing the gain of the skyhook control of the rear wheel when the preview control of the front wheel is successful, a required amount of control may be outputted, and the damper 22 of the rear wheel tire 54 is able to absorb the vibration of the vehicle 10 more compared to when the gain is not increased.

As described above, the active suspension device 1 according to the first embodiment is configured to include a preview sensor 3 and an ECU 24. The ECU 24 is configured to include a front wheel preview control part 241, a preview control success determination part 242, and a rear wheel control part 243.

When the preview control success determination part 242 determines that a preview control of a front wheel has been successful, the rear wheel control part 243 performs a preview control and a skyhook control to control the stroke of a suspension for a corresponding rear wheel through the success processing unit 244. When, on the other hand, the preview control success determination part 242 determines that a preview control of a front wheel has been unsuccessful, the rear wheel control part 243 cancels a preview control for a corresponding rear wheel and performs a skyhook control for the corresponding rear wheel through the failure processing part 245.

In this way, the active suspension device 1 according to the first embodiment prevents a risk of deterioration of the ride comfort of a person on the vehicle 10 even when the preview control success determination part 242 determines that the preview control of the front wheel has been unsuccessful.

In the present embodiment, the preview control success determination part 242 determines the preview control by the front wheel preview control part 241. However, the determination of a preview control is not limited to the description of above.

For example, when the preview sensor 3 detects an object such as a plastic bag or a plastic bottle and detects a height of the road surface 100, the front wheel preview control part 241 changes the length (the stroke of the suspension) of the damper 22 of a front wheel based on a height of the object such as a plastic bag or a plastic bottle. In this case, when a front wheel tire 14 steps on the object such as a plastic bag or a plastic bottle, the object becomes deformed. This means that the height of the road surface 100 that was detected by the preview sensor 3 is erroneous.

An embodiment according to the disclosure is able to determine the failure of the preview control even in such a case, as will be described next. When an erroneous detection of a height of the road surface 100 by the preview sensor 3 occurs due to an object such as a plastic bag or a plastic bottle, the length of the damper 22 of a front wheel becomes inappropriate as the object deforms. The inappropriate length of the damper 22 of the front wheel causes an above-spring acceleration of the above-spring element or a below-spring acceleration of the below-spring element of the vehicle body 12 to change.

By setting a predetermined threshold value of the acceleration sensor to a relatively low value, the preview control success determination part 242 may make a detailed determination on whether the preview control of the front wheel is successful. This way, when the height of the road surface 100 is erroneously detected by the object such as a plastic bag or a plastic bottle, the rear wheel control part 243 is able to perform a skyhook control for a rear wheel tire 54 through the failure processing part 245.

What is claimed is:

1. An active suspension device comprising:
a road surface state detector configured to detect a height of a road surface in front of a wheel; and
a controller,
wherein the controller is configured to control a stroke of a suspension according to a variation of the height of the road surface detected by the road surface state detector to perform a preview control,
wherein the controller is configured to
change, as a front wheel preview control, a stroke of a suspension of a front wheel according to the variation of the height of the road surface detected by the road surface state detector to perform a preview control of the front wheel,
determine, as a determination part, whether the preview control that has been performed by the front wheel preview control by changing the stroke of the suspension of the front wheel is successful, and
control, as a rear wheel control, a stroke of a suspension of a corresponding rear wheel based on the determination of the determination part, wherein, in response to determining that the preview control of the front wheel is successful, the controller is configured, as the rear wheel control, to perform a preview control and a skyhook control of the corresponding rear wheel to control the stroke of the suspension of the corresponding rear wheel, and wherein, in response to determining that the preview control of the front wheel is unsuccessful, the controller is configured, as the rear wheel control, to cancel the preview control of the corresponding rear wheel and perform the skyhook control of the corresponding rear wheel.

2. The active suspension device according to claim 1, wherein the controller is further configured, as the rear wheel control, to change a gain of the skyhook control of the rear wheel that is performed when the preview control of the front wheel is successful compared to a gain of the skyhook control of the rear wheel that is performed when the preview control of the front wheel is unsuccessful.

3. The active suspension device according to claim 2, wherein the controller is further configured to
compare, as the determination part, an actual body operation with a theoretical vehicle model, the theoretical vehicle model assuming an operation when the preview control of the front wheel is turned off, and, in response to the actual body operation being worse than the theoretical vehicle model, determine, as the determination part, that the preview control of the front wheel is unsuccessful.

4. The active suspension device according to claim 1, wherein the controller is further configured to
compare, as the determination part, an actual body operation with a theoretical vehicle model, the theoretical vehicle model assuming an operation when the preview control of the front wheel is turned off, and, in response to the actual body operation being worse than the theoretical vehicle model, determine, as the determination part, that the preview control of the front wheel is unsuccessful.

5. The active suspension device according to claim 4 further comprising:

a sensor configured to detect an acceleration of a vehicle body along a stroke axis of the suspension of the front wheel, wherein the controller is further configured, in response to a value of the sensor at a time when the front wheel is passing over a level difference of the road surface being equal to or greater than a predetermined value, to determine, as the determination part, that the preview control of the front wheel is unsuccessful.

6. A vehicle including the active suspension device according to claim 1.

* * * * *